Dec. 30, 1924. 1,520,940
A. A. DULITZ
PROCESS FOR THE MANUFACTURE OF SEALING CAPS AND FOR
APPLYING THEM ONTO THE VESSELS TO BE SEALED
Filed March 1, 1922
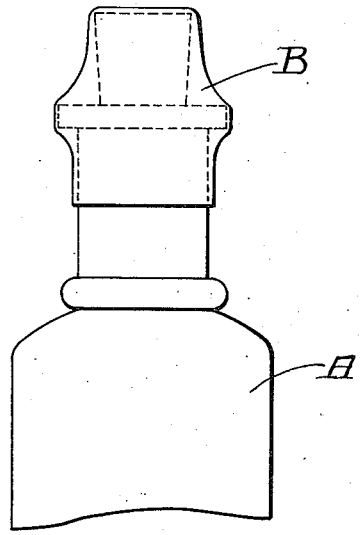
Inventor
A. A. Dulitz.
By Marks & Clerk
Attys.

Patented Dec. 30, 1924.

1,520,940

UNITED STATES PATENT OFFICE.

AUGUST ADOLF DULITZ, OF HIRSCHBERG, GERMANY.

PROCESS FOR THE MANUFACTURE OF SEALING CAPS AND FOR APPLYING THEM ONTO THE VESSELS TO BE SEALED.

Application filed March 1, 1922. Serial No. 540,380.

*To all whom it may concern:*

Be it known that I, AUGUST ADOLF DULITZ, a citizen of Germany, residing at 25 Steinstrasse, Hirschberg, Silesia, Germany, have invented a certain new and useful Process for the Manufacture of Sealing Caps and for Applying Them Onto the Vessels to be Sealed.

It is known to manufacture sealing caps from acetyl cellulose—which in contradistinction to those made from viscose, are water-resistant—that moist pellicles of acetyl cellulose are applied onto the vessel which is to be sealed and are allowed to shrink thereon. The shrinking takes place by the cellulose acetate losing part of its water.

The pellicles which are used for sealing must naturally be stored in a still moist state and despatched in the same state. This necessity presents considerable drawbacks when using the said caps and makes their use possible only under certain circumstances.

The primary object of the present invention is to provide an improved dry elastic sealing cover and an improved process for manufacturing the same. These improvements in accordance with the invention may be made from acetyl cellulose, which covers can be despatched in a dry state like the known celluloid caps and which can be caused to shrink by immersion into water, if the acetyl cellulose is mixed with suitable quantities of water-soluble softening means. For practical reasons, more especially owing to the difficulty of obtaining suitable dissolving means, it is preferable to use acetyl celluloses which do not belong to the "chloroform-soluble" group.

With the foregoing object outlined and with other objects in view, the invention consists in the novel features hereinafter described in detail, illustrated in the accompanying drawing and more particularly pointed out in the appended claims.

The drawing shows a side view of the upper portion of a bottle with my improved pellicle attached thereto.

In the drawing, A designates a bottle and B the improved cover.

The acetyl celluloses employed in the present invention are, for instance, dissolved in a suitable dissolving medium and mixed with a sufficient quantity of water-soluble softening means such as acetin, and from this solution in a known way, an elastic pellicle is manufactured by the immersion therein of a suitable model.

For the manufacture of the sealing covers, the said elastic pellicle is applied onto the vessel to be sealed upon which it adapts itself very well owing to its elastic properties. After the pellicle has settled onto the vessel, it is immersed into the water. An exchange of the softening means against water occurs whereby a strong shrinking of the pellicle takes place which shrinking, after the water has been evaporated, becomes so great that a durable and intimate combination between the pellicle and the vessel, that is a sealing of the vessel, is obtained.

The improved sealing has the great advantage over known sealings that when treated with water, a very strong shrinking is obtained whereby it becomes possible to use a much smaller number of sizes in stock than with known similar substances which also shrink but in a smaller degree.

Owing to the elastic property of the pellicle, a good adherence is obtained even with dry treatment, which adherence owing to the subsequent treatment with water, is rendered stronger. Moreover the improved covers may be mixed with suitable filling and colouring substances, such as bronze powder or the like, and it is therefore possible to adapt the sealing caps to all tastes, more particularly for luxury articles such as scent bottles and the like, which is of considerable importance, since they may form a substitute for the stanniol caps, whilst having the same appearance.

Example of carrying the process into effect:

10 parts of acetone-soluble acetyl cellulose are dissolved in 90 parts of acetone and 10 parts of acetin are added. A glass model is immersed into this solution and according to the usual process by allowing the dissolving means to evaporate, an elastic pellicle of suitable thickness is obtained, which is then stripped off and sprinkled, if necessary with talc and rolled up.

If it is desired to manufacture coloured pellicles, suitable colouring matters are added to the solution.

What I claim is:—

1. A process for obtaining a dry sealing cover consisting in dissolving acetyl cellulose and a water free water soluble means capable of softening the acetyl cellulose, in a medium capable of dissolving the same without adding moisture to the acetyl cellulose, and then permitting the dissolving medium to evaporate, to form an elastic pellicle.

2. A process as claimed in claim 1 in which the water soluble means has properties similar to acetin.

3. A process as claimed in claim 1 in which 10 parts of acetyl cellulose are used with 90 parts of acetone and 10 parts of acetyl.

4. A dry elastic sealing cover consisting of a pellicle formed of acetyl cellulose and a water free water soluble means capable of rapidly shrinking after being immersed in water and exposed to the atmosphere.

5. A process for sealing vessels consisting in dissolving acetyl cellulose and a water free water soluble means capable of softening the acetyl cellulose, in a medium capable of dissolving the same without adding moisture to the acetyl cellulose, then forming a dry elastic pellicle from said mixture by permitting the dissolving medium to evaporate, placing this pellicle over the mouth of the receptacle to be sealed, then submerging the mouth of the receptacle and the pellicle in water, and then withdrawing the pellicle from the water and permitting the same to dry and rapidly shrink.

In testimony whereof I have signed my name to this specification.

AUGUST ADOLF DULITZ.

Witnesses:
ARTHUR SCHROEDER,
JOHN W. BULKLEY.